United States Patent [19]

Colafati

[11] Patent Number: 5,837,363
[45] Date of Patent: Nov. 17, 1998

[54] RIGID FOAM ROOFING PRODUCT

[75] Inventor: Ralph Colafati, Glendora, Calif.

[73] Assignee: Building Materials Corporation of America, Wayne, N.J.

[21] Appl. No.: 729,257

[22] Filed: Oct. 9, 1996

[51] Int. Cl.$^6$ .............................. B32B 3/26; B32B 27/00; B05D 7/00; B27N 9/00
[52] U.S. Cl. .................................. 428/311.11; 428/314.4; 428/319.1; 428/319.3; 428/218; 428/220; 428/921
[58] Field of Search .............................. 428/314.4, 319.1, 428/319.3, 218, 220, 421, 311.11

[56] References Cited

U.S. PATENT DOCUMENTS

| | | | |
|---|---|---|---|
| 3,899,855 | 8/1975 | Gadsby | 52/90 |
| 4,535,002 | 8/1985 | Kirkhuff | 427/203 |
| 4,725,457 | 2/1988 | Ward et al. | 427/385.5 |
| 5,010,116 | 4/1991 | Colafati | 521/155 |
| 5,221,707 | 6/1993 | Chihara et al. | 524/267 |

*Primary Examiner*—Lynette F. Smith
*Assistant Examiner*—Brett Nelson
*Attorney, Agent, or Firm*—Walter Katz; Marilyn J. Maue; William J. Davis

[57] ABSTRACT

A roofing product is described which includes a substantially rigid foam core backed with a moisture resistant coating, a mineral aggregate layer overlying said foam core, a membrane layer thereon, a plurality of glass fibers embedded within said membrane layer or present as a separate layer between said aggregate and membrane layers, and a topcoat polymer shell on said membrane layer and overlying the edges of the product.

13 Claims, 4 Drawing Sheets

RIGID FOAM ROOFING PRODUCT

BACKGROUND OF THE INVENTION

1. Field of the Invention

This invention relates to roofing products, and, more particularly, to tiles, shakes, slates or shingles made from rigid foam with a weatherable outer skin.

2. Description of the Prior Art

In 1963, Chamberlain, in U.S. Pat. No. 3,111,787 described a plywood roofing panel with a plastic foam core and a roofing felt surface. In the early 1970's, Merrill, in U.S. Pat. No. 3,605,369, and Martin, in U.S. Pat. No. 3,760,546, described foam core shakes having metal weathering surfaces. Derry, in U.S. Pat. No. 3,774,428, also disclosed a polyurethane foam shake roof panel with a weatherable topcoat. Subsequently, numerous patents have described polyurethane foam roofing shakes of varying designs, including U.S. Pat. Nos. 3,897,667; 3,899,855; 3,943,677; 4,028,450; 4,191,722; 4,279,106; and 5,215,805.

Since the late 1970's, several polyurethane foam shingles, shakes, slates and tiles have reached the market place. For example, CeDurShake®, manufactured by Trim Products, Inc. (Torrance, Calif.), was commercialized in the early 1980's; it was a polyurethane foam shake reinforced by fiberglass and covered with a polyester shell so that it looked like a wood product. However, this shake warped badly on exposure. Another polyurethane shake was made by the Polymer Building Products Co. (Houston, Tex.) in the 1980's, which was a semi-flexible polyurethane foam woodlike shake with an acrylic coated integral skin and an asphalt shingle backing. However, this product failed to perform satisfactorily under operating conditions.

In the 1990's, Cal-Shake, Inc. and its successor, Everest Roofing Products (Whittier, Calif.) marketed a polyurethane foam roofing tile based upon the technology described by Kirkhuff in U.S. Pat. Nos. 3,852,934; 4,065,899; 4,443,258; and 4,535,002. The features of this product included an interlocking combination shingle and sheeting arrangement with sufficient fire retardant materials therein to provide flame resistance. Here again, the product failed to perform satisfactorily under rigorous operating conditions.

Colafati, in U.S. Pat. No. 5,010,116, disclosed a composition for making sprayable and pourable water-blown urethane foams having densities of about 1.5 to 4 lb/ft$^3$, which were useful for polyurethane roofing and insulation products.

Accordingly, it is the object of this invention to provide a commercially-acceptable rigid foam roofing product. This and other objects and features of the invention will be made apparent from the following description of the invention.

SUMMARY OF THE INVENTION

What is provided herein is a rigid foam roofing product, in the form of a tile, shake, slate or shingle, primarily for use in residential home construction. The structure of this roofing product includes a plurality of layers which are designed to function in combination to meet the rigorous tests imposed upon it by the roofing industry and the consumer. In one form of this invention, the product includes: (a) a rigid foam core, preferably a closed-cell, high density, substantially water-insoluble, rigid polyurethane foam core, backed with a moisture resistant coating; (b) a mineral ore as an aggregate layer on said foam; (c) a membrane layer on the aggregate layer; preferably an elastomeric membrane; (d) a plurality of glass fibers embedded within the membrane layer, or present as a separate layer between the membrane and the aggregate layer; and (e) an exterior or topcoat layer positioned on the membrane and extending around the edges of the other layers to provide weathering, moisture resistance and UV protection for the product. A deep molded interlock system within the structure assures effective wind and rain resistance and provides for ready installation on decks of various shapes.

DETAILED DESCRIPTION OF THE INVENTION

Rigid Foam Roofing Product

Figure 1:
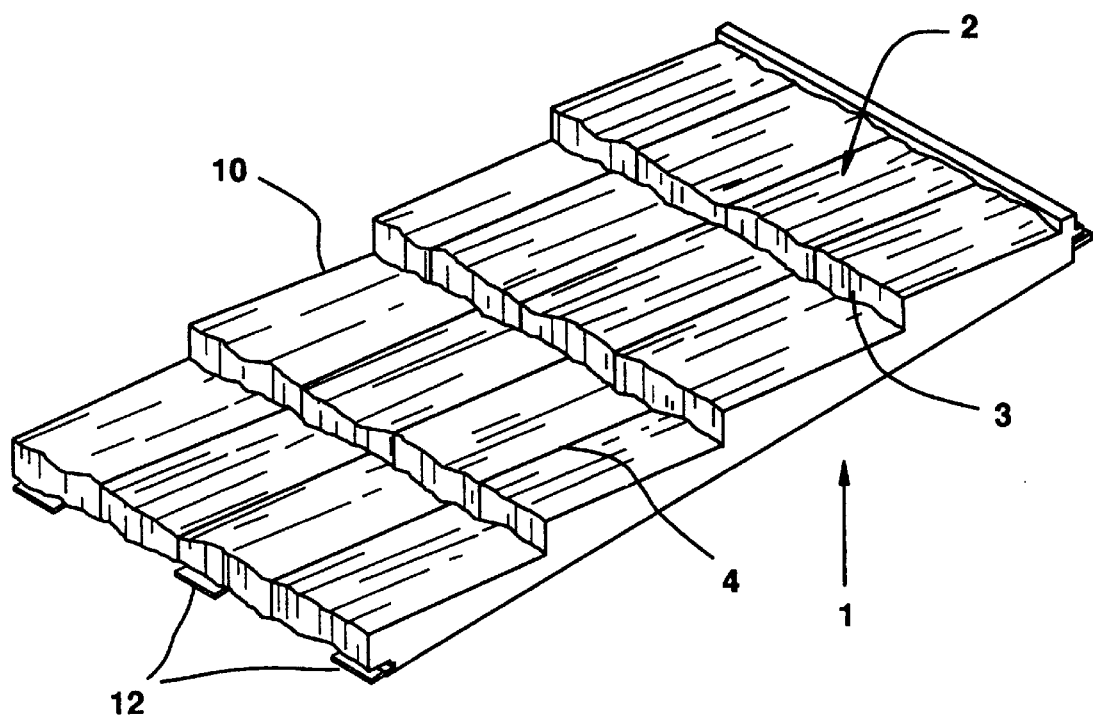
FIG. 1 is a perspective view of a building panel having an exterior skin configuration resembling a hand-split shake roof which embodies the principal features of the invention.

With reference to the drawings, the roofing panel of the invention is seen in FIG. 1 at 10, to comprise a substantially rectangular construction having the appearance of a plurality of shakes or wood shingles arranged in two courses.

Figure 2:
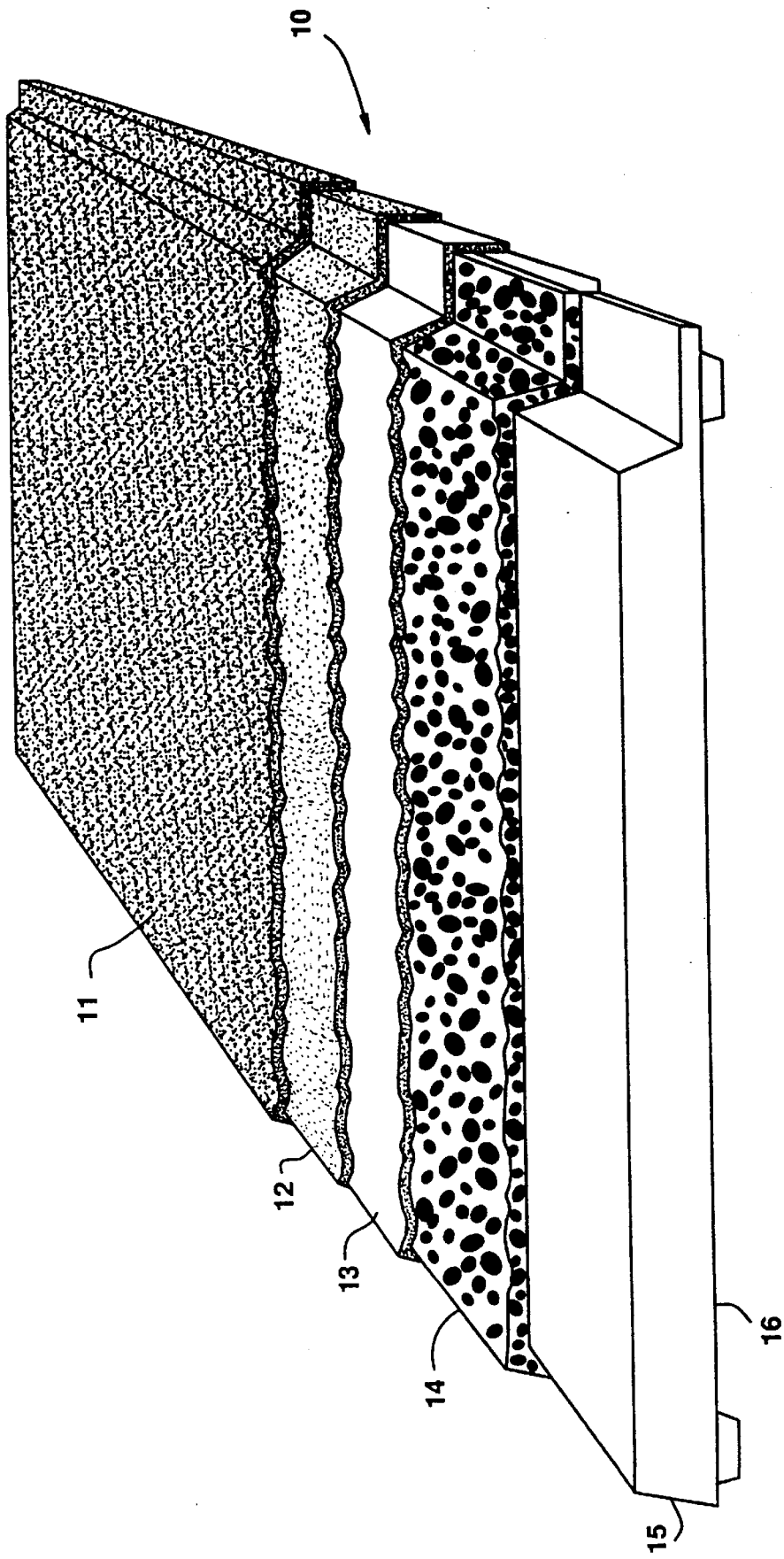
FIG. 2 is a horizontal cross-section through the panel of FIG. 1.

The product of the present invention is manufactured by coating the inside of a mold shaped to provide a particular shape, preferably with a release material, then coating at least a portion of the mold having a surface designed to shape the exterior of the product to be exposed to the elements. As shown in FIG. 2, the outer layer 11 of the panel, referred to herein as the "topcoat", is a plastic material designed to produce a hard shell for the product. The remainder of the mold then is filled with suitable material to provide the desired layers of the product. These layers include the membrane layer 12, the glass fibers 13, the mineral ore or aggregate layer 14, the rigid foam layer 15 and the foam backing layer 16. The mold is then closed to encapsulate the foam material during curing.

Foam Material

The rigid foam material forms almost the entire thickness of the product which in a shake may vary from approximately one-quarter of an inch at one end to one inch at the other end. Such a thickness of foam material provides extremely effective insulation contrasted to that provided by normal roofing or siding material. In such thicknesses, the material of the layer 15 is strong enough that workmen laying roofs with the product may walk on single ones or layers of the products.

The material 15 is a resin suitable for making a rigid foam. A preferred resin is a closed cell plastic foam such as polyurethane, although a polyester resin such as polyester terephthalate, may be used as well. In the preferred embodiment, the foam is formed of diphenylmethane diisocyanate and oxyalkylated polyol mixed in substantially equal amounts, although other ratios for particular characteristics will be apparent to those skilled in the art. These compounds suitably are mixed in substantially equal proportions and catalyzed by an amine based catalyst, although other catalysts such as a metal catalyst may be used. The preferred amount of catalyst is approximately one percent by weight of the polyurethane compound. The particular catalyst, and the amount used, corresponds to the length of time necessary for different stages of the foam expansion in the mold to occur, and, also for the necessary curing time desired for the manufacturing process.

Preferred rigid foam resin formulations are shown in Tables 1 and 2 below.

TABLE 1

FOAM RESIN FORMULATION

| Components | Hydroxyl Range | % by Wt. |
|---|---|---|
| Polyol-1 | 300–800 | 25–75 |
| Polyol-2 | 24–800 | 5–60 |
| Crosslinker/Chain Extender | 600–1800 | 0.5–40 |
| Filler | — | 1–75 |
| Fire Retardant | 0–700 | 1–50 |
| Surfactant | — | 0.5–5.0 |
| Water | — | 0.1–6.0 |
| Amine Catalyst | — | 0.01–5.0 |
| Trimerization Catalyst | — | 0.01–5.0 |
| Diphenylmethane/Diisocyanate (MDI) Index* | — | 1.0–400 |

TABLE 2

| Components | % by Wt. |
|---|---|
| Polyether Polyol 530 | 38.7 |
| Polyether Polyol 240 | 10.0 |
| Diethylene Glycol | 2.0 |
| Barium Sulfate | 35.0 |
| Melamine | 10.0 |
| Silicone Surfactant | 1.5 |
| Water | 1.5 |
| Amine Catalyst, DABCO-33LV | 0.5 |
| Trimerization Catalyst, TMR-4 | 0.8 |
| Diphenylmethane/Diisocyanate Index* | 140 |

*1:1.4 polyol:diisocyanate (stoichiometric basis)

In a typical roofing product, the resultant closed-cell, rigid polyurethane/polyisocyanurate foam usually includes about 150–450 g of foam material, which is made with water as blowing agent. None of the other components of the foam layer are water-soluble. As a result, the foam is Class A in the spread of flame, Class II in the ASTM-84 test, and, accordingly, it provides the bulk of protection for the Class A rating of the shingle. The foam has a compressive strength of >49 psi. The foam layer also includes an interlock which provides for wind resistance.

In this invention, the desired properties of the rigid foam layer are achieved herein by its high density, i.e. about 2.5–7.0 lbs/ft$^3$, thereupon, this foam layer has excellent dimensional stability, and does not show the warping problems commonly associated with prior foam shingles. Furthermore, because of its high compressive strength, the foam layer also allows for product walkability, whereas the low compressive strength and low density of prior foam layers made it impossible to achieve Class A standards for the product without the use of expensive thermal barriers.

Back Coating

The foam layer is provided with a back coating 16 which suitably may be an acrylic or aliphatic polymer, or mixture thereof, although other known waterproofing materials may be used. This coating is included in the back of the mold, or it may be applied after the product has been demolded. The presence of this back coating provides additional water protection for the product by preventing absorption of water from the surroundings into the foam layer.

Topcoat

The topcoat or weathering exterior or outer 11 shell of the roofing product of the invention is suitably comprised of acrylic or aliphatic urethane polymer, or mixture thereof; at a thickness of about 3–30 mils. The topcoat provides the product with ultraviolet resistance, color retention and also acts as a moisture barrier. By itself, the topcoat achieves Class A in the spread of flame test.

The topcoat in this invention preferably is a molecularly crosslinked polymer from several components which is molded at about 1500 lbs/sq. in. Suitable topcoat polymers and their corresponding suitable thicknesses include PTFE (1 mil), aliphatics (3 mils), silicones (20 mils, acrylic urethane (20 mils), aromatic urethanes (25 mils) and epoxy resins (30 mils). A preferred topcoating is an aliphatic urethane (3 mils).

The roofing product of this invention achieves Class A in the spread of flame by a combination of flame retardants in the topcoat. Such flame retardant materials preferably are a blend of melamine, zinc borate and a bromide, most preferably in about equal amounts, e.g. about 10% by weight of each in the topcoat.

Representative topcoat formulations are shown in Table 3 as below:

TABLE 3

| | % by Wt. | |
|---|---|---|
| Components | Suitable | Preferred |
| Essential | | |
| Aliphatic Urethane Dispersion (or Resin*) | 40–70 | 62.0 |
| Melamine | 5–40 | 10.0 |
| Zinc Borate | 5–40 | 10.0 |
| Bromide | 5–40 | 10.0 |
| Optional | | |
| Defoamer | 0.1–10 | 0.5 |
| Wetting Agent | 0.1–10 | 0.5 |
| Pigments | 1–10 | 2.0 |
| Thickener Agent | 0.1–5 | 1.0 |
| UV Absorber | 1–5 | 2.0 |

*An aliphatic isocyanate resin is used at 0.9–1.20 index, which is a calculated weight based on stoichiometry.

The topcoat formulation given above is a 1-component, water-based coating; however, it may function as a 2-component system if the dispersion is replaced by a resin* and the blend is reacted with an aliphatic isocyanate to form the coating.

Membrane Layer

The membrane layer 14 is a high-strength reinforcing layer for the rigid foam roofing product of the present invention. As such, it provides impact resistance, strength and a moisture barrier for the foam layer. The membrane itself also achieves Class A status in the spread of the flame, is flexible and has excellent ageing characteristics. Generally, the membrane is formed at a thickness of about 20–40 mils and a weight of about 40–50 g/part.

There are a number of elastomeric materials that could be used as the membrane layer, including epoxy, polyester and polyurethane materials. However, in this composite, it is necessary that the membrane material also be fire resistant and have good impact strength. A preferred material is polyurethane which is made from the following formulations given in Tables 4 and 5 below:

TABLE 4

ELASTOMERIC MEMBRANE FORMULATION

| Component | % by Wt. |
|---|---|
| Essential | |
| Polyurethane Polyol (Hydroxyl range 25–1000) | 30–80 |
| Chain Extender/Crosslinker (Hydroxyl Range 240–1800) | 5–40 |
| Melamine | 5–40 |
| Zinc Borate | 5–40 |
| Bromide | 5–40 |
| Catalyst | 0.01–2.0 |
| Optional | |
| Defoamer | 0.01–2.0 |

This formulation then is reacted with a suitable diisocyanate to form the polyurethane* component of the elastomeric membrane layer.

* Diphenylmethane/Diisocyanate Index 100.0 1:1 Polyol:Diisocyanate

TABLE 5

| Component | % by Wt. |
|---|---|
| Essential | |
| 6500 MW Triol | 49.2 |
| 1,4-Butanediol | 9.0 |
| Melamine | 13.0 |
| Zinc Borate | 13.0 |
| Saytex BT 93W (1,2-bis(tetrabromo-phthaimido)ethane) | 13.0 |
| Catalyst | 0.3 |
| Optional | |
| Molecular Sieve | 2.0 |
| Defoamer | 0.5 |

Glass Fiber Component

The glass fiber component may be embedded within the membrane layer 13 of the roofing product herein, or, as shown, applied as a separate layer 13 between the membrane layer 13 and the mineral ore aggregate layer 14, generally in an amount of about 5–25 g. Accordingly, the glass fibers may be incorporated into the membrane during its formation as a distinct layer, or applied after the membrane layer is formed and while it is still in the liquid state. The presence of the glass fibers in the product herein provides critical reinforcement for the product, and, particularly, enhances the impact resistance of the membrane layer.

Mineral Aggregate Layer

The mineral ore or aggregate layer 14 is included in the structure to provide a mechanical bond between the rigid foam layer and the successive coatings thereon. A suitable mineral ore or aggregate material is perlite in an amount of about 80–300 g.

Referring now to FIG. 2, there is shown the deep molded interlock system of the present invention. A suitable interlock herein is cut at about 0.8–0.9 inch which provides the roofer with flexibility if the roof is not square without sacrificing the advantageous wind uplift feature of the product. The foam and the molded interlock are keyed together to provide a wind uplift of >100 mph.

Process of Manufacture

Figure 3:
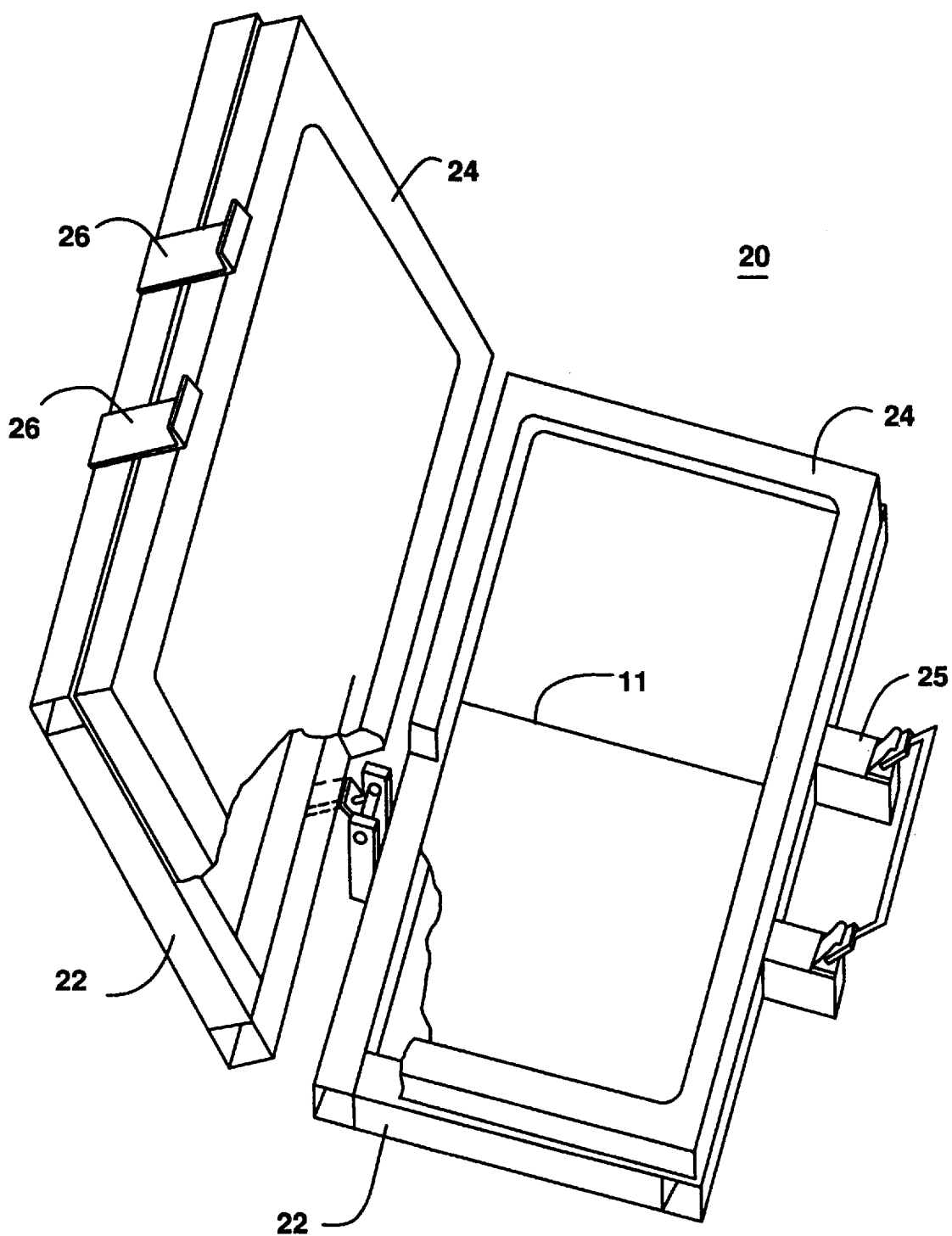
FIG. 3 is a vertical cross-sectional view of two adjacent panels of the type illustrated by FIG. 1 showing the manner of securing the panels to a structural building element such as a rafter or stud.
Figure 4:
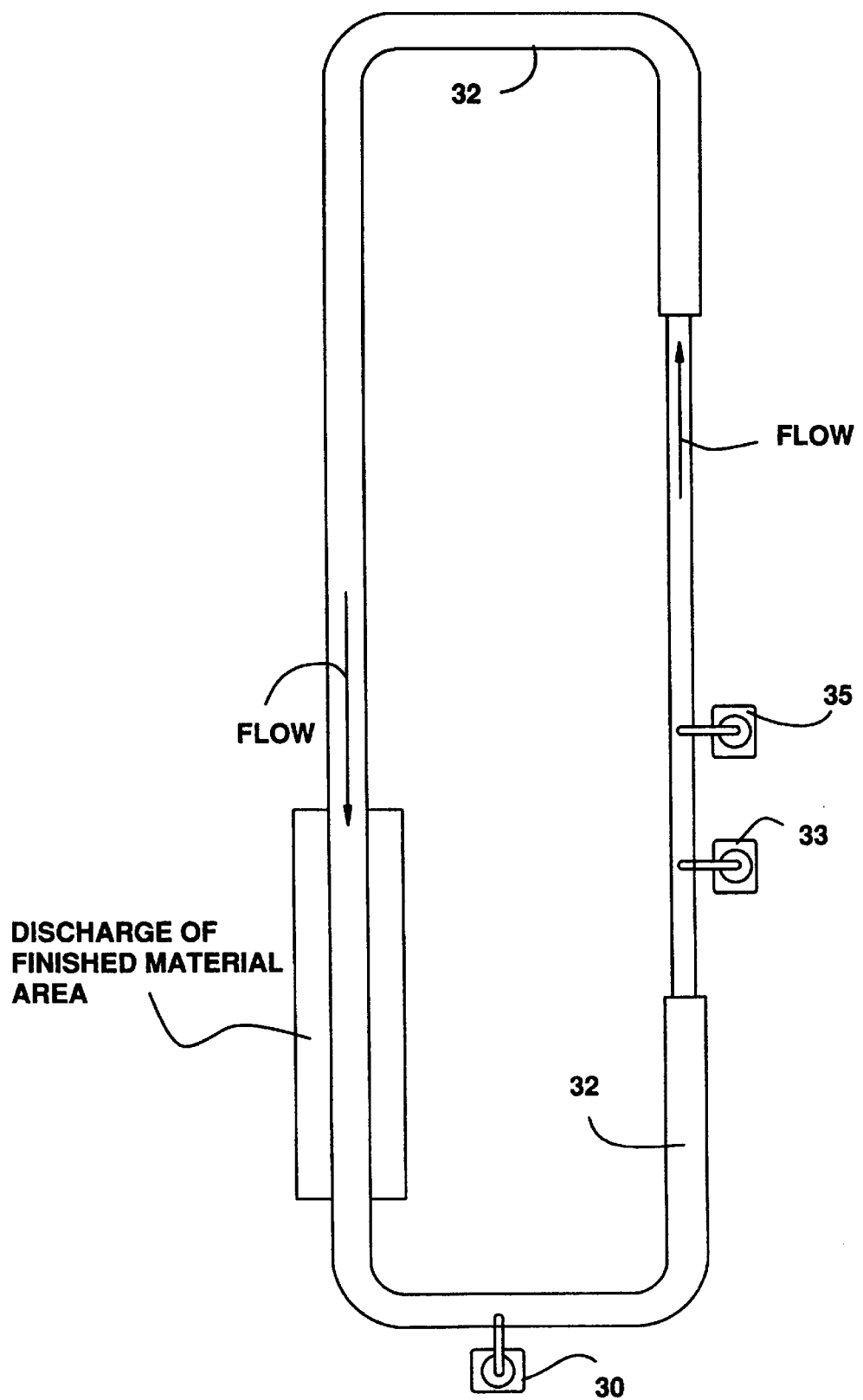
FIG. 4 is a plan view of the abutting panels of FIG. 3.

The process of manufacture of the rigid foam roofing product of the present invention is illustrated in FIGS. 3 and 4. FIG. 3 shows a mold 20 created using typical methods. The mold 20 has an outer frame 22 which may preferably be constructed of steel. The frame 22 is formed in two halves which are hinged. Each half of the frame 22 holds one-half of the mold 24 in which the products of the present invention are formed. Each half of such a mold 24 may be conveniently formed of a material which is itself moldable. In the preferred embodiment of the invention, each half is made of a moldable aluminum filled urethane elastomer. Because the mold material may itself be molded, the mold 24 may be easily shaped in a manner well known to the prior art to emulate a natural wood, tile, or other natural product. The face half of the mold 24 (shown in the upper left frame portion of FIG. 3) is concave and shaped to present the form of the exterior of a cedar shake, of a tile surface, or of a similar product such as slate or stone. The back half of the mold is flat or is formed to produce a particular shape desired for the undersurface of the product to be molded. The two halves of the frame are hinged together so that they may be closed and locked together once material has been placed inside the mold. A locking mechanism including elements 25 and 26 are shown for this purpose.

The mold is opened and covered on both sides of the interior with a release material many of which are well known to those skilled in the art. Typically, this release material is applied by an airless spray. In the preferred process, this occurs at a station shown as station 30 in FIG. 4. The opened mold is then placed on a moving production line such as a belt conveyer 32. The individual molds are then transferred by the conveyer 32 to a second station 33 at which a first layer of topcoat material is applied to the face mold and back coating. This layer is applied (in the preferred embodiment) in a layer approximately eight mils thick to the interior face of the mold, the side of the mold 24 having an surface designed to give the appearance of a shake (or other natural product or some desired design) and containing sides for holding the closed cell foam. The material of this layer may also include a coloring compound designed to color the final product to resemble the natural product it emulates.

The opened mold 24 is then transferred to a third station 35 where the same half of the mold receives a second interior face coat of a material such as a urethane polymer in a 30 mil layer including the glass fiber. This material has a gel time of approximately 5 seconds. This material is also typically applied by the use of a spray gun which may be mounted above the conveyer 32. It is possible for a coloring material to be included in this layer as well.

While the invention has been described with particular reference to certain embodiments thereof, it will be understood that changes and modifications may be made which are within the skill of the art. Accordingly, it is intended to be bound only by the following claims, in which:

What is claimed is:

1. A roofing product selected from the group consisting of tile, shingle, shake, board and a panel which is capable of withstanding a wind uplift speed of 100 mph or more comprising:

(a) a substantially rigid foam core of water-insoluble urethane having a density of about 1–15 lbs/ft$^3$ wherein the foam is Class A in the spread of flame, Class II in the ASTM E-84, has a walkable compressive strength of greater than 40 psi, backed with a moisture resistant coating, (b) a mineral aggregate layer overlying said foam core, (c) an elastomer membrane layer which is selected from the group consisting of an epoxy, polyester and polyurethane resin, and mixtures thereof, (d) a plurality of glass fibers embedded within said membrane layer or present as a separate layer between said aggregate and membrane layers, and (e) a topcoat polymer shell which is an aliphatic urethane coating at least about 3 mils thick on said membrane layer and overlying the edges of the product.

2. A roofing product according to claim 1 wherein the urethane foam is a closed cell urethane having a foam density of about 5 lbs/ft$^3$.

3. A roofing product according to claim 1 wherein both the foam and topcoat layers include a water-insoluble fire retardant composition.

4. A roofing product according to claim 3 wherein said fire retardant composition comprises melamine, zinc borate and 1,2-bis(tetrabromophthaimido)ethane.

5. A roofing product according to claim 4 wherein said fire retardant components are present in substantially equal amounts.

6. A roofing product according to claim 1 also including one or more of the group consisting of a UV absorber, a wetting agent, pigment and thickener.

7. A roofing product according to claim 1 wherein said elastomeric membrane is a composition which includes, by weight, 30–80% of a polyurethane polyol having a hydroxyl range of 25–1000, 5–40% of a chain extender/crosslinker diol having a hydroxyl range of 240–1800, 25–55% of a water-insoluble fire retardant composition, 0.01–2% of a catalyst, and 0.01–2% of a defoamer, which is reacted with a suitable amount of an aromatic diisocyanate to form an aromatic polyurethane polymer.

8. A roofing product according to claim 7 wherein the composition comprises about 50% of a polyurethane polyol, about 10% of the chain extender/crosslinker, and about 40% of the fire retardant composition.

9. A roofing product according to claim 7 in which said aromatic diisocyanate and the diphenylmethane diisocyanate having an index of about 100.

10. A roofing product according to claim 1 in which the glass fibers are embedded in the elastomeric membrane.

11. A roofing product according to claim 1 in which the glass fibers are present as a separate layer between the membrane and the mineral ore aggregate layer.

12. A roofing product according to claim 1 wherein the foam core comprises, by weight, 30–50% of a polyether polyol having a number of about 530 hydroxyl, about 5–15% of a polyether polyol having a hydroxyl number of about 240, about 1–3% of an aliphatic chain extender/crosslinker, about 30–55% of a water-insoluble fire retardant composition, a catalyst, water as blowing agent, and the diphenylmethane diisocyanate index is about 140.

13. A roofing product according to claim 1 wherein the foam core is a polyurethane/polyisocyanurate polymer.

* * * * *